(12) United States Patent
Fujisawa et al.

(10) Patent No.: US 12,025,827 B2
(45) Date of Patent: Jul. 2, 2024

(54) ILLUMINATION DEVICE

(71) Applicant: Japan Display Inc., Tokyo (JP)

(72) Inventors: Koji Fujisawa, Tokyo (JP); Ken Kagabu, Tokyo (JP); Hiroaki Kijima, Tokyo (JP); Ken Onoda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/336,054

(22) Filed: Jun. 16, 2023

(65) Prior Publication Data
US 2023/0408751 A1    Dec. 21, 2023

(51) Int. Cl.
*F21V 8/00*    (2006.01)

(52) U.S. Cl.
CPC ......... *G02B 6/0076* (2013.01); *G02B 6/0053* (2013.01); *G02B 6/0055* (2013.01)

(58) Field of Classification Search
CPC .. G02B 6/0076; G02B 6/0053; G02B 6/0055; G02B 6/0078
See application file for complete search history.

(56) References Cited

U.S. PATENT DOCUMENTS

| | | | |
|---|---|---|---|
| 9,310,053 B2 * | 4/2016 | Qiao | G02B 6/0028 |
| 2010/0073903 A1 * | 3/2010 | Yun | G02B 6/0016 362/97.1 |
| 2012/0008308 A1 * | 1/2012 | Adachi | G02B 6/0021 362/97.1 |
| 2018/0031882 A1 | 2/2018 | Ota | |
| 2020/0400983 A1 | 12/2020 | Komura et al. | |

FOREIGN PATENT DOCUMENTS

| | | |
|---|---|---|
| JP | 2018-017804 A | 2/2018 |
| JP | 2019-158962 A | 9/2019 |

* cited by examiner

*Primary Examiner* — Matthew J. Peerce
(74) *Attorney, Agent, or Firm* — XSENSUS LLP (57) ABSTRACT

According to one embodiment, an illumination device includes a first light guide, a second light guide and a plurality of light sources. The first light guide includes a first main surface, a second main surface facing the first main surface, and a first side surface connected to the second light guide. The first side surface further includes a first connection surface and a second connection surface. The first connection surface extends from an end portion of the first main surface to the second main surface and obliquely extends so as to move away from the second side surface. The second connection surface perpendicularly extends from an end portion of the first connection surface to an end portion of the second main surface.

9 Claims, 8 Drawing Sheets

ILLUMINATION DEVICE

CROSS-REFERENCE TO RELATED APPLICATIONS

This application is based upon and claims the benefit of priority from Japanese Patent Application No. 2022-098005, filed Jun. 17, 2022, the entire contents of which are incorporated herein by reference.

FIELD

Embodiments described herein relate generally to an illumination device.

BACKGROUND

For example, a display device such as a liquid crystal display device comprises a display panel comprising pixels, and an illumination device such as a backlight which illuminates the display panel. The illumination deice comprises a light source which emits light, and a light guide which is illuminated by the light emitted from the light source.

Recently, large-scale illumination devices in which a plurality of light guides are connected to each other so as to function as one light guide have been developed.

DETAILED DESCRIPTION

In general, according to one embodiment, an illumination device comprises a first light guide, a second light guide which is adjacent to and connected to the first light guide in a first direction, and a plurality of light sources which emit light to the first light guide and the second light guide. The first light guide comprises a first main surface, a second main surface facing the first main surface, and a first side surface connected to the second light guide. The second light guide comprises a third main surface, a fourth main surface facing the third main surface, and a second side surface connected to the first light guide. The first side surface further includes a first connection surface and a second connection surface. The first connection surface extends from an end portion of the first main surface to the second main surface, and obliquely extends so as to move away from the second side surface. The second connection surface perpendicularly extends from an end portion of the first connection surface to an end portion of the second main surface. The second side surface further includes a third connection surface and a fourth connection surface. The third connection surface extends from an end portion of the third main surface to the fourth main surface, and obliquely extends so as to move away from the first side surface. The fourth connection surface perpendicularly extends from an end portion of the third connection surface to an end portion of the fourth main surface.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

Figure 1:
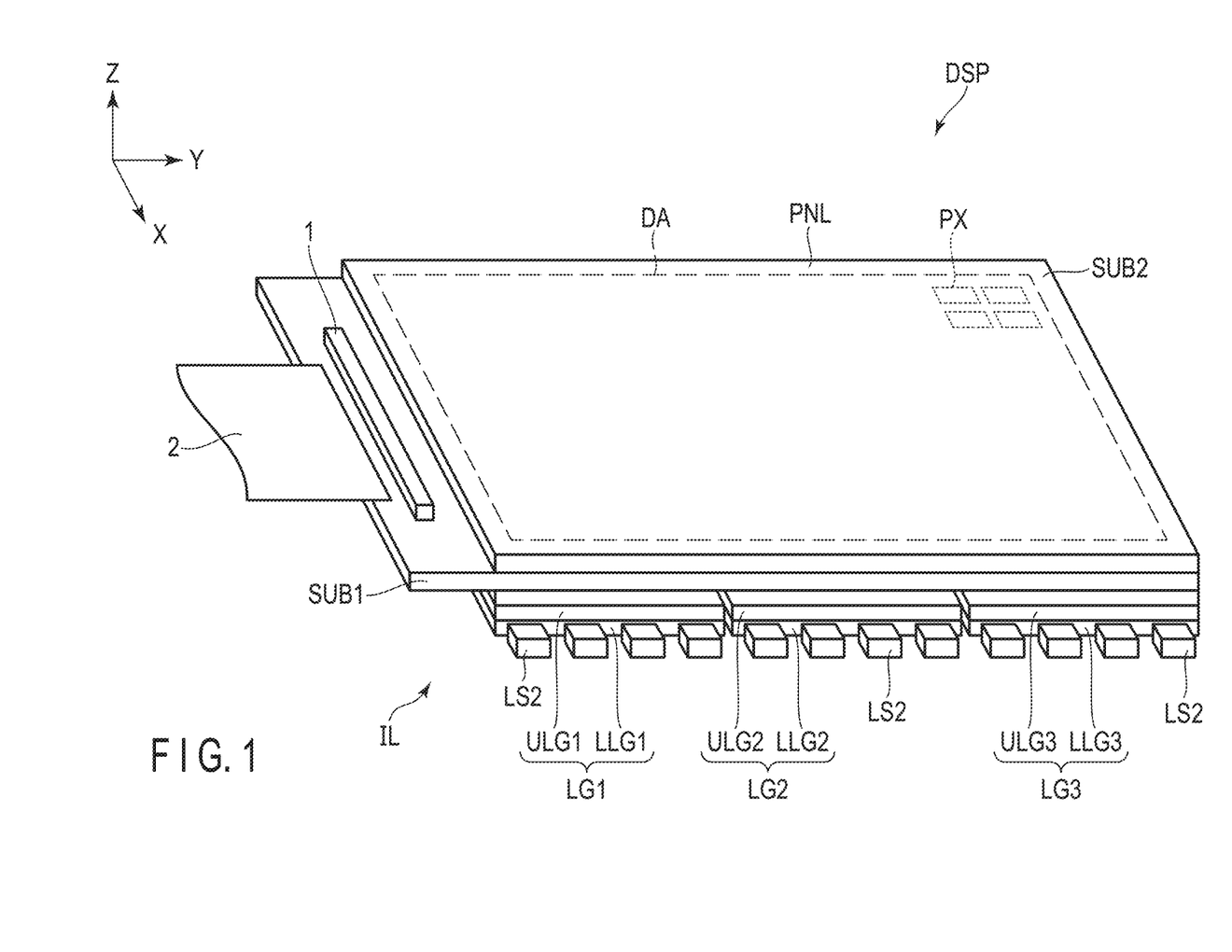
FIG. 1 is an exploded perspective view showing a general configuration example of a display device comprising an illumination device according to an embodiment.

FIG. 1 is an exploded perspective view showing the general configuration of a display device DSP according to an embodiment. As shown in FIG. 1, direction X, direction Y and direction Z are defined. Direction X, direction Y and direction Z are orthogonal to each other. However, they may intersect at an angle other than 90°. Direction X and direction Y are equivalent to directions parallel to the main surfaces of the substrates constituting the display device DSP. Direction Z is equivalent to the thickness direction of the display device DSP.

The display device DSP comprises a display panel PNL, an illumination device IL, an IC chip 1 and an interconnection substrate 2.

The display panel PNL comprises a first substrate SUB1 and a second substrate SUB2. The display panel PNL comprises a display area DA which displays an image. The display panel PNL comprises, for example, a plurality of pixels PX arrayed in matrix in the display area DA.

The IC chip 1 and the interconnection substrate 2 may read signals from the display panel PNL. However, they mainly function as signal sources which supply signals to the display panel PNL. For example, as shown in the figure, the IC chip 1 and the interconnection substrate 2 are mounted on, of the first substrate SUB1, the portion exposed from the second substrate SUB2. It should be noted that the IC chip 1 may be mounted on the interconnection substrate 2. The interconnection substrate 2 is, for example, a flexible printed board which can be bent.

The illumination device IL illuminates the display panel PNL. The illumination device IL comprises a first light guide LG1, a second light guide LG2, a third light guide LG3, a plurality of first light sources LS1 (see FIG. 2) and a plurality of second light sources LS2. The first light guide LG1, the second light guide LG2 and the third light guide LG3 are arranged in direction Y. FIG. 1 shows that, for convenience sake, the first light guide LG1, the second light guide LG2 and the third light guide LG3 are not connected to each other. However, the first light guide LG1, the second light guide LG2 and the third light guide LG3 are connected to each other in practice. In other words, in the illumination device IL, the first light guide LG1, the second light guide LG2 and the third light guide LG3 are connected to each other and function as one light guide as a whole. The first light sources LS1 and the second light sources LS2 are described later, detailed description thereof being omitted here.

Each of the first light guide LG1, the second light guide LG2 and the third light guide LG3 includes two light guides provided one above the other. Of the two light guides provided one above the other, the light guide located on the upper side is referred to as an upper light guide ULG, and the light guide located on the lower side is referred to as a lower light guide LLG. In other words, the first light guide LG1 includes an upper light guide ULG1 and a lower light guide LLG1. The second light guide LG2 includes an upper light guide ULG2 and a lower light guide LLG2. The third light guide LG3 includes an upper light guide ULG3 and a lower light guide LLG3.

Figure 2:
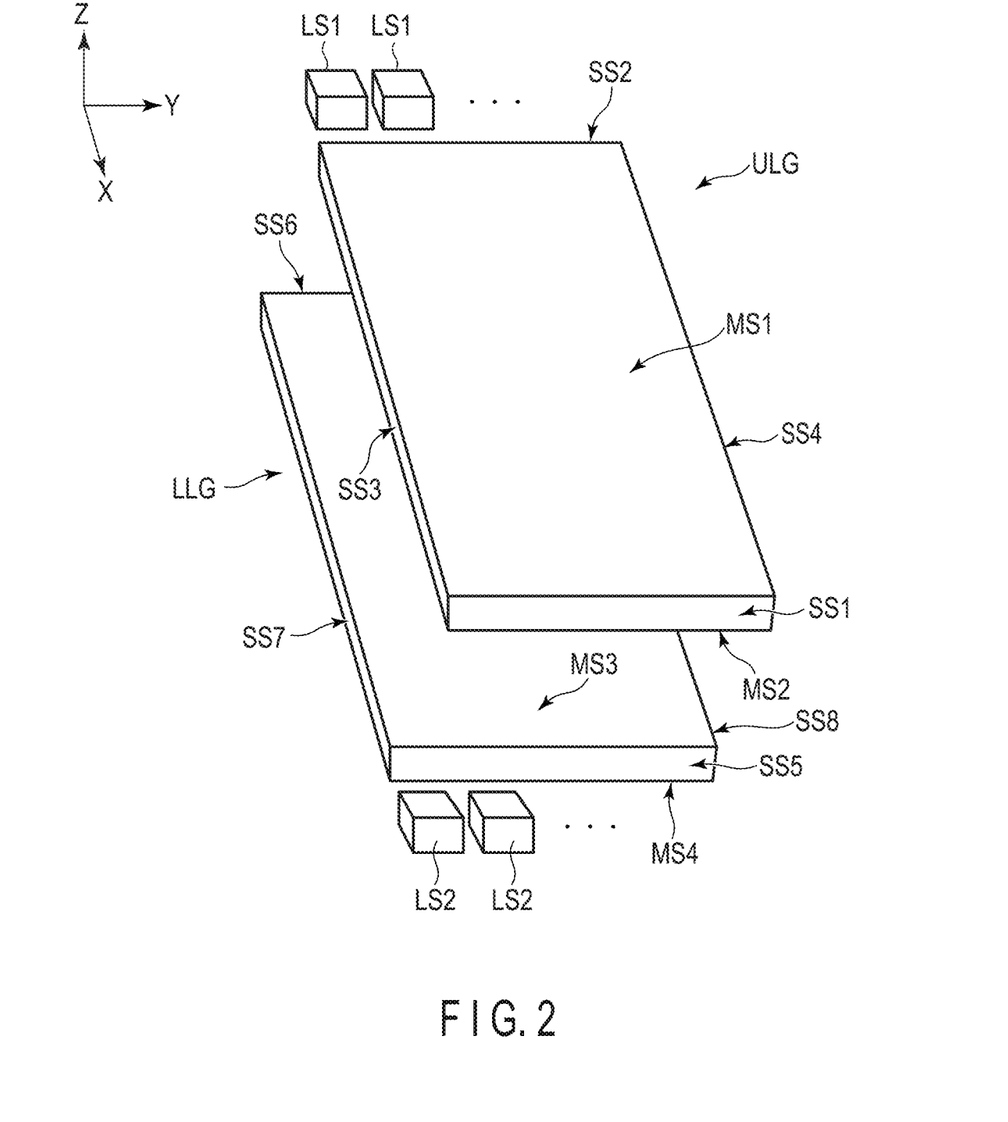
FIG. 2 is an exploded perspective view for explaining the positional relationships of an upper light guide, a lower light guide, first light sources and second light sources.

Now, this specification explains the positional relationships of the upper light guide ULG, the lower light guide LLG, the first light sources LS1 and the second light sources LS2 with reference to FIG. 2. FIG. 2 is an exploded perspective view for explaining the positional relationships of the upper light guide ULG, the lower light guide LLG, the first light sources LS1 and the second light sources LS2.

As shown in FIG. 2, the upper light guide ULG comprises a first main surface MS1 parallel to the X-Y plane, a second main surface MS2 located on the opposite side of the first main surface MS1 in direction Z, a first side surface SS1 parallel to the Y-Z plane, a second side surface SS2 located on the opposite side of the first side surface SS1 in direction X, a third side surface SS3 parallel to the X-Z plane, and a fourth side surface SS4 located on the opposite side of the third side surface SS3 in direction Y. The first main surface MS1 faces the display panel PNL shown in FIG. 1. The first light sources LS1 face the second side surface SS2. The first light sources LS1 are arranged at intervals in direction Y.

As shown in FIG. 2, the lower light guide LLG comprises a third main surface MS3 parallel to the X-Y plane, a fourth main surface MS4 located on the opposite side of the third main surface MS3 in direction Z, a fifth side surface SS5 parallel to the Y-Z plane, a sixth side surface SS6 located on the opposite side of the fifth side surface SS5 in direction X, a seventh side surface SS7 parallel to the X-Z plane, and an eighth side surface SS8 located on the opposite side of the seventh side surface SS7 in direction Y. The third main surface MS3 faces the second main surface MS2 of the upper light guide ULG. The second light sources LS2 face the fifth side surface SS5. The second light sources LS2 are arranged at intervals in direction Y.

The first side surface SS1 of the upper light guide ULG overlaps the fifth side surface SS5 of the lower light guide LLG in plan view. The second side surface SS2 of the upper light guide ULG overlaps the sixth side surface SS6 of the lower light guide LLG in plan view. The third side surface SS3 of the upper light guide ULG overlaps the seventh side surface SS7 of the lower light guide LLG in plan view. The fourth side surface SS4 of the upper light guide ULG overlaps the eighth side surface SS8 of the lower light guide LLG in plan view.

The first light sources LS1 and the second light sources LS2 are, for example, laser light sources such as semiconductor lasers which emit a polarized laser beam. It should be noted that the first light sources LS1 or the second light sources LS2 are not limited to devices which emit a laser beam and may be, for example, light emitting diodes.

Each of the first light sources LS1 and the second light sources LS2 may comprise a plurality of light emitting elements which respectively emit light of different colors. For example, when each of the first light sources LS1 and the second light sources LS2 comprises three light emitting elements which respectively emit red light, green light and blue light, light of a mixed color (for example, white) of these colors can be obtained.

Figure 3:
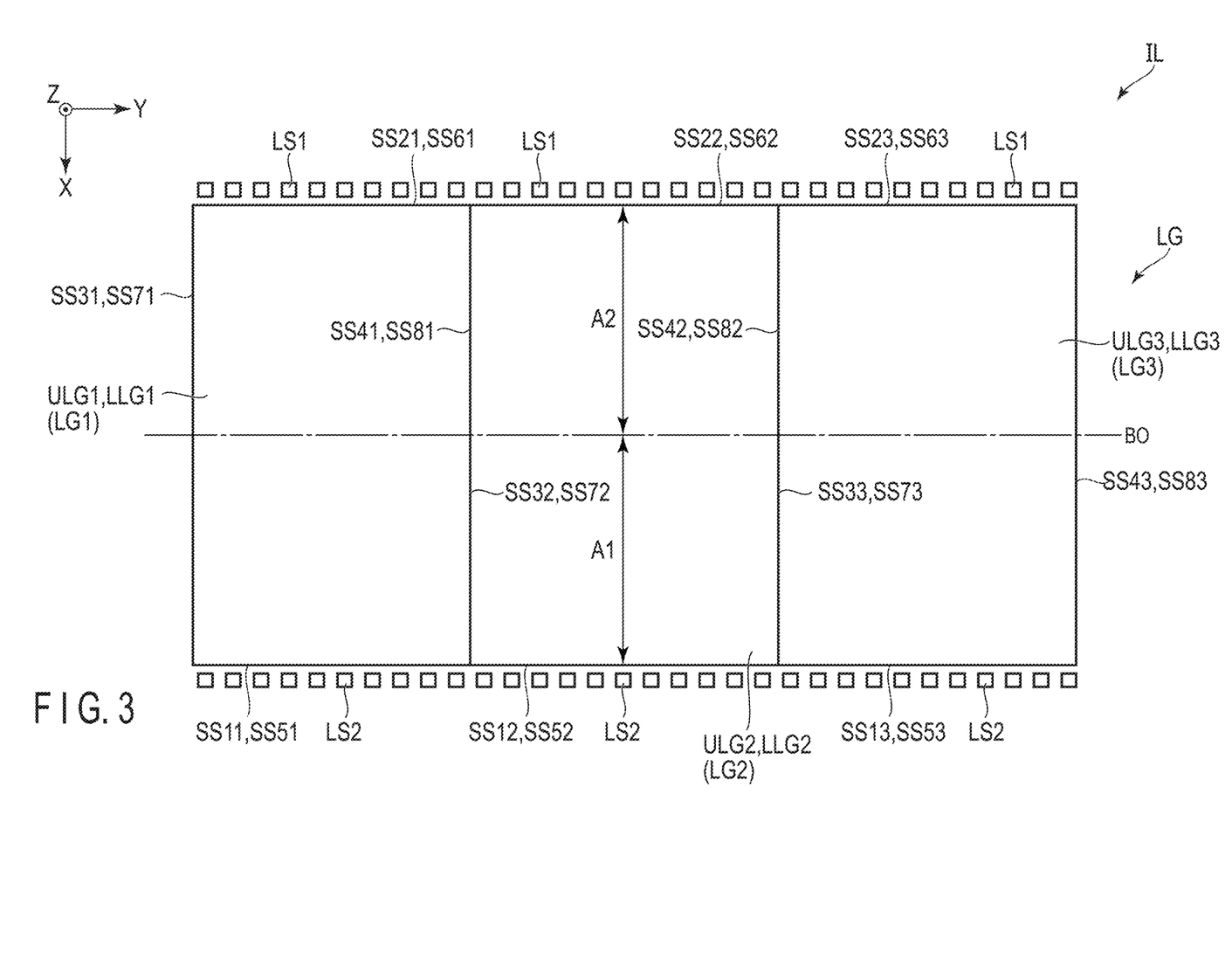
FIG. 3 is a plan view showing a general configuration example of the illumination device.

FIG. 3 is a plan view showing the schematic configuration of the illumination device IL.

As shown in FIG. 3, the illumination device IL comprises the first light guide LG1, the second light guide LG2 and the third light guide LG3. These light guides LG1 to LG3 are arranged in direction Y. The first light guide LG1, the second light guide LG2 and the third light guide LG3 function as one light guide LG as a whole.

The fourth side surface SS41 of the upper light guide ULG1 of the first light guide LG1 is in contact with and connected to the third side surface SS32 of the upper light guide ULG2 of the second light guide LG2. The eighth side surface SS81 of the lower light guide LLG1 of the first light guide LG1 is in contact with and connected to the seventh side surface SS72 of the lower light guide LLG2 of the second light guide LG2.

The fourth side surface SS42 of the upper light guide ULG2 of the second light guide LG2 is in contact with and connected to the third side surface SS33 of the upper light guide LG3 of the third light guide LG3. The eighth side surface SS82 of the lower light guide LLG2 of the second light guide LG2 is in contact with and connected to the seventh side surface SS73 of the lower light guide LLG3 of the third light guide LG3.

The third side surface SS31 of the upper light guide ULG1 of the first light guide LG1, the seventh side surface SS71 of the lower light guide LLG1 of the first light guide LG1, the fourth side surface SS43 of the upper light guide ULG3 of the third light guide LG3 and the eighth side surface SS83 of the lower light guide LLG3 of the third light guide LG3 are, of the light guide LG, the end surfaces orthogonal to the Y direction.

The illumination device IL comprises a first area A1, a second area A2 and a boundary BO between the first area A1 and the second area A2. The length of the first area A1 in direction X is, for example, equal to that of the second area A2 in direction X. The first side surface SS11 of the upper light guide ULG1 of the first light guide LG1 and the fifth side surface SS51 of the lower light guide LLG1 of the first light guide LG1 are located in the first area A1. The second side surface SS21 of the upper light guide ULG1 of the first light guide LG1 and the sixth side surface SS61 of the lower light guide LLG1 of the first light guide LG1 are located in the second area A2. The boundary BO is equivalent to the midpoint between the first side surface SS11 of the upper light guide ULG1 of the first light guide LG1 and the opposite second side surface SS21 of the upper light guide ULG1 of the first light guide LG1 and the midpoint between the fifth side surface SS51 of the lower light guide LLG of the first light guide LG1 and the opposite sixth side surface SS61 of the lower light guide LLG1 of the first light guide LG1.

Regarding the second light guide LG2, similarly, the first side surface SS12 of the upper light guide ULG2 of the second light guide LG2 and the fifth side surface SS52 of the lower light guide LLG2 of the second light guide LG2 are located in the first area A1. The second side surface SS22 of the upper light guide ULG2 of the second light guide LG2 and the sixth side surface SS62 of the lower light guide LLG2 of the second light guide LG2 are located in the second area A2.

Regarding the third light guide LG3, similarly, the first side surface SS13 of the upper light guide ULG3 of the third light guide LG3 and the fifth side surface SS53 of the lower light guide LLG3 of the third light guide LG3 are located in the first area A1. The second side surface SS23 of the upper light guide ULG3 of the third light guide LG3 and the sixth side surface SS63 of the lower light guide LLG3 of the third light guide LG3 are located in the second area A2.

The first light sources LS1 face the second side surfaces SS2 of the three upper light guides ULG1 to ULG3 included in the light guide LG and are arranged at intervals in direction Y. The first light sources LS1 emit light to the second side surfaces SS2. As explained in detail later, the light emitted from the first light sources LS1 travels while repeating total reflection inside the upper light guide ULG and is extracted to the outside in the first area A1 as it is out of the conditions for total reflection. The second light sources LS2 face the fifth side surfaces SS5 of the three lower light guides LLG1 to LLG3 included in the light guide LG and are arranged at intervals in direction Y. The second light sources LS2 emit light to the fifth side surfaces SS5. As explained in detail later, the light emitted from the second light sources LS2 travels while repeating total reflection inside the lower light guide LLG and is extracted to the outside in the second area A2 as it is out of the conditions for total reflection.

Figure 4:
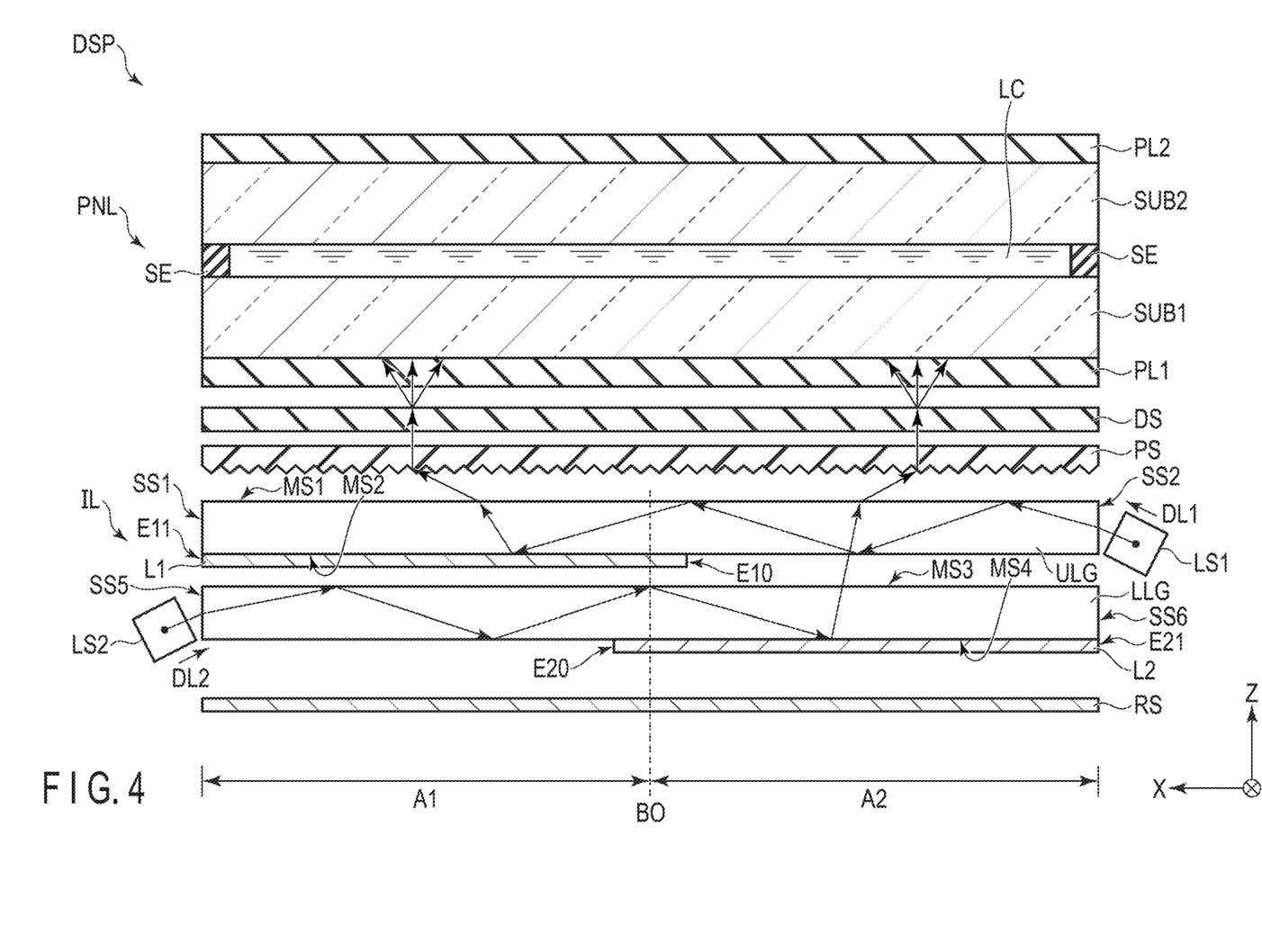
FIG. 4 is a cross-sectional view showing a general configuration example of the display device.

FIG. 4 is a cross-sectional view of the display device DSP shown in FIG. 1. As shown in FIG. 4, the display panel PNL further comprises a liquid crystal layer LC, a sealant SE, a polarizer PL1 and a polarizer PL2.

The liquid crystal layer LC and the sealant SE are located between the first substrate SUB1 and the second substrate SUB2. The first substrate SUB1 adheres to the second substrate SUB2 by the sealant SE. The liquid crystal layer LC is sealed in between the substrate SUB1 and the second substrate SUB2 by the sealant SE.

The polarizer PL1 is attached to the lower surface of the first substrate SUB1. The polarizer PL2 is attached to the upper surface of the second substrate SUB2. The polarization axis of the polarizer PL1 and the polarization axis of the polarizer PL2 are, for example, orthogonal to each other.

The illumination device IL further comprises a first layer L1, a second layer L2, a diffusion sheet DS, a prism sheet PS and a reflective sheet RS. It should be noted that two prism sheets PS may be provided so as to overlap each other in direction Z.

The diffusion sheet DS is located between the display panel PNL and the upper light guide ULG. The diffusion sheet DS diffuses the light which enters the diffusion sheet DS and uniformizes the brightness of the light. The prism sheet PS is located between the diffusion sheet DS and the upper light guide ULG. For example, the prism sheet PS condenses the light emitted from the first main surface MS1 of the upper light guide ULG into direction Z. The reflective sheet RS faces the fourth main surface MS4 of the lower light guide LLG. For example, the reflective sheet RS reflects the light leaking out of the lower light guide LLG and causes the light to enter the lower light guide LLG again.

Each of the first layer L1 and the second layer L2 is a layer including a plurality of prisms. The first layer L1 is located in the second main surface MS2 of the upper light guide ULG. The first layer L1 extends from the first area A1 to the region between the boundary BO and the second side surface SS2 across the boundary BO.

The first layer L1 comprises an end portion E10, and an end portion E11 on the opposite side of the end portion E10. The end portion E10 is located between the boundary BO and the second side surface SS2 and is close to the boundary BO. The end portion E11 is close to the first side surface SS1. For example, the end portion E10 corresponds to the position of, of the prisms included in the first layer L1, the prism which is the closest to the second side surface SS2. For example, the end portion E11 corresponds to the position of, of the prisms included in the first layer L1, the prism which is the closest to the first side surface SS1.

The second layer L2 is located in the fourth main surface MS4. The second layer L2 extends from the second area A2 to the region between the boundary BO and the fifth side surface SS5 across the boundary BO. The second layer L2 comprises an end portion E20, and an end portion E21 on the opposite side of the end portion E20. The end portion E20 is located between the boundary BO and the fifth side surface SS5 and is close to the boundary BO. The end portion E21 is close to the sixth side surface SS6. For example, the end portion E20 corresponds to the position of, of the prisms included in the second layer L2, the prism which is the closest to the fifth side surface SS5. For example, the end portion E21 corresponds to the position of, of the prisms included in the second layer L2, the prism which is the closest to the sixth side surface SS6.

The first layer L1 and the second layer L2 overlap each other in direction Z in the boundary BO and near the boundary BO.

The first light sources LS1 are spaced apart from the second side surface SS2. The emission direction DL1 of the first light sources LS1 is a direction intersecting with the normal direction of the second side surface SS2. The second light sources LS2 are spaced apart from the fifth side surface SS5. The emission direction DL2 of the second light sources LS2 is a direction intersecting with the normal direction of the fifth side surface SS5.

The light emitted from the first light sources LS1 is refracted by the second side surface SS2 and enters the upper light guide ULG. Of the light which entered the upper light guide ULG, the light which travels to the first main surface MS1 is reflected on the interface between the upper light guide ULG and an air layer. Of the light which entered the upper light guide ULG, the light which travels to the second main surface MS2 is also reflected on the interface between the upper light guide ULG and an air layer. In this way, the light emitted from the first light sources LS1 travels inside the upper light guide ULG while repeating reflection in the region in which the first layer L1 is not provided in the second area A2.

The traveling direction of, of the light which travels inside the upper light guide ULG, the light which travels to the first layer L1 is changed by the prism of the first layer L1. This light is emitted from the first main surface MS1 as it is out of the conditions for the total reflection of the first main surface MS1. The light emitted from the first main surface MS1 illuminates the display panel PNL via the prism sheet PS and the diffusion sheet DS.

Similarly, the light emitted from the second light sources LS2 is refracted by the fifth side surface SS5 and enters the lower light guide LLG. This light travels inside the lower light guide LLG while repeating reflection on the third main surface MS3 and the fourth main surface MS4 in the region in which the second layer L2 is not provided in the first area A1. The traveling direction of, of the light which travels inside the lower light guide LLG, the light which travels to the second layer L2 is changed by the prism of the second layer L2. This light is emitted from the third main surface MS3 as it is out of the conditions for the total reflection of the third main surface MS3. The light emitted from the third main surface MS3 illuminates the display panel PNL via the upper light guide ULG, the prism sheet PS and the diffusion sheet DS.

In the first area A1, the display panel PNL is mainly illuminated by the light emitted from the first light sources LS1. In the second area A2, the display panel PNL is mainly illuminated by the light emitted from the second light sources LS2.

Figure 5:
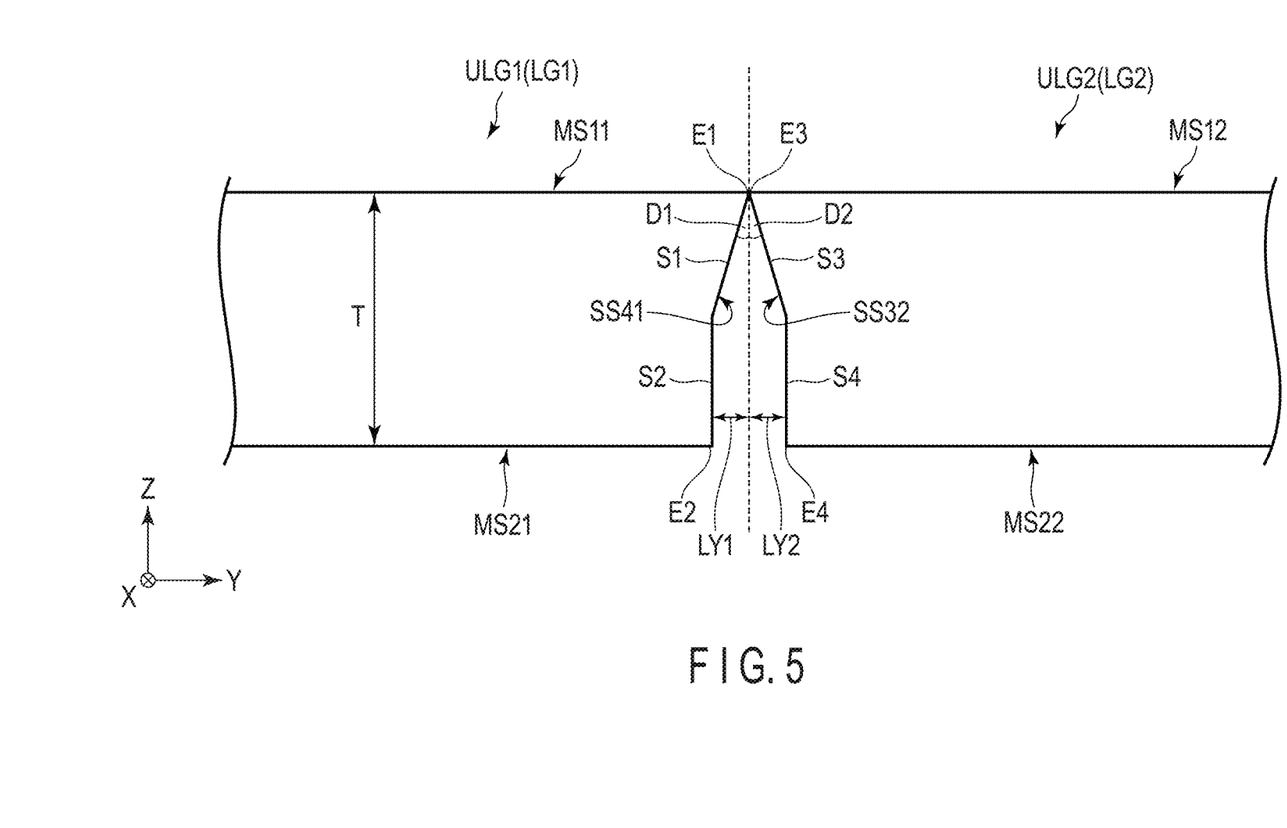
FIG. 5 is a cross-sectional view for explaining the shape of a connection portion.

Now, this specification explains the shape of the portion in which the side surfaces of two light guides are in contact with and connected to each other with reference to FIG. 5. In the following description, the portion in which the side surfaces of two light guides are in contact with and connected to each other is referred to as a connection portion, and the side surfaces of the connection portion are referred to as connection surfaces.

FIG. 5 is a diagram for explaining the shape of a connection portion. For example, FIG. 5 shows the connection portion in which the fourth side surface SS41 of the upper light guide ULG1 of the first light guide LG1 is in contact with and connected to the third side surface SS32 of the upper light guide ULG2 of the second light guide LG2. It should be noted that the other connection portions have similar shapes.

As shown in FIG. 5, in the connection portion, the fourth side surface SS41 of the upper light guide ULG1 of the first light guide LG1 further includes a first connection surface and a second connection surface. The first connection surface comprises an oblique side S1 which extends from the end portion E1 of a first main surface MS11 to a second main surface MS21, and which obliquely extends so as to move away from the third side surface SS32 of the upper light guide ULG2 of the second light guide LG2. The second connection surface comprises a side S2 which perpendicularly extends from the end portion of the oblique side S1 to the end portion E2 of the second main surface MS21. Thus, the end portion E1 does not overlap the end portion E2 in plan view. The fourth side surface SS41 of the upper light guide ULG1 of the first light guide LG1 comprises a step caused by the oblique side S1 and the side S2. In a cross-sectional view, the oblique side S1 is provided at an angle with the side S2. Mirror finishing is applied to the first connection surface and the second connection surface.

Similarly, the third side surface SS32 of the upper light guide ULG2 of the second light guide LG2 further includes a third connection surface and a fourth connection surface. The third connection surface comprises an oblique side S3 which extends from the end portion E3 of a first main surface MS12 to a second main surface MS22, and which obliquely extends so as to move away from the fourth side surface SS41 of the upper light guide ULG1 of the first light guide LG1. The fourth connection surface comprises a side S4 which perpendicularly extends from the end portion of the oblique side S3 to the end portion E4 of the second main surface MS22. Thus, the end portion E3 does not overlap the end portion E4 in plan view. The third side surface SS32 of the upper light guide ULG2 of the second light guide LG2 comprises a step caused by the oblique side S3 and the side S4. In a cross-sectional view, the oblique side S3 is provided at an angle with the side S4. Mirror finishing is applied to the third connection surface and the fourth connection surface.

The first angle D1 between the oblique side S1 of the upper light guide ULG1 and direction Z is equal to the second angle D2 between the oblique side S3 of the upper light guide ULG2 and direction Z. The length of the oblique side S1 of the upper light guide ULG1 is equal to that of the oblique side S3 of the upper light guide ULG2. The length of the side S2 of the upper light guide ULG1 is equal to that of the side S4 of the upper light guide ULG2. Thus, in the connection portion, the upper light guides ULG1 and ULG2 have a bisymmetrical shape. It should be noted that the first angle D1 and the second angle D2 may be referred to as taper angles.

As shown in FIG. 5, in the connection portion, the end portion E1 of the first main surface MS11 of the upper light guide ULG1 is in contact with the end portion E3 of the first main surface MS12 of the upper light guide ULG2, and the end portion E2 of the second main surface MS21 of the upper light guide ULG1 is not in contact with the end portion E4 of the second main surface MS22 of the upper light guide ULG2. As described in detail later, by shaping the connection portion in this way, when the display device DSP is observed, the connection portion can be made inconspicuous in any direction.

Each of the first angle D1 and the second angle D2 should be preferably set so as to be, for example, an angle from 1° to 5°. The relationship between length LY1 from the end portion E2 of the second main surface MS21 of the upper light guide ULG1 to the end portion E1 of the first main surface MS11 in direction Y and plate thickness T of the upper light guide ULG1 should be preferably set such that (length LY1/plate thickness T)×100 is in the range from 0.8 to 1.5. Similarly, the relationship between length LY2 from the end portion E4 of the second main surface MS22 of the upper light guide ULG2 to the end portion E3 of the first main surface MS12 in direction Y and plate thickness T of the upper light guide ULG2 should be preferably set such that (length LY2/plate thickness T)×100 is in the range from 0.8 to 1.5.

In the following description, the effects of the illumination device IL of the present embodiment are explained using a comparative example. It should be noted that the comparative example is shown to merely explain part of the effects which could be obtained from the illumination device IL of the present embodiment and does not exclude the effects common to the comparative example and the present embodiment from the scope of the present invention.

Figure 6:
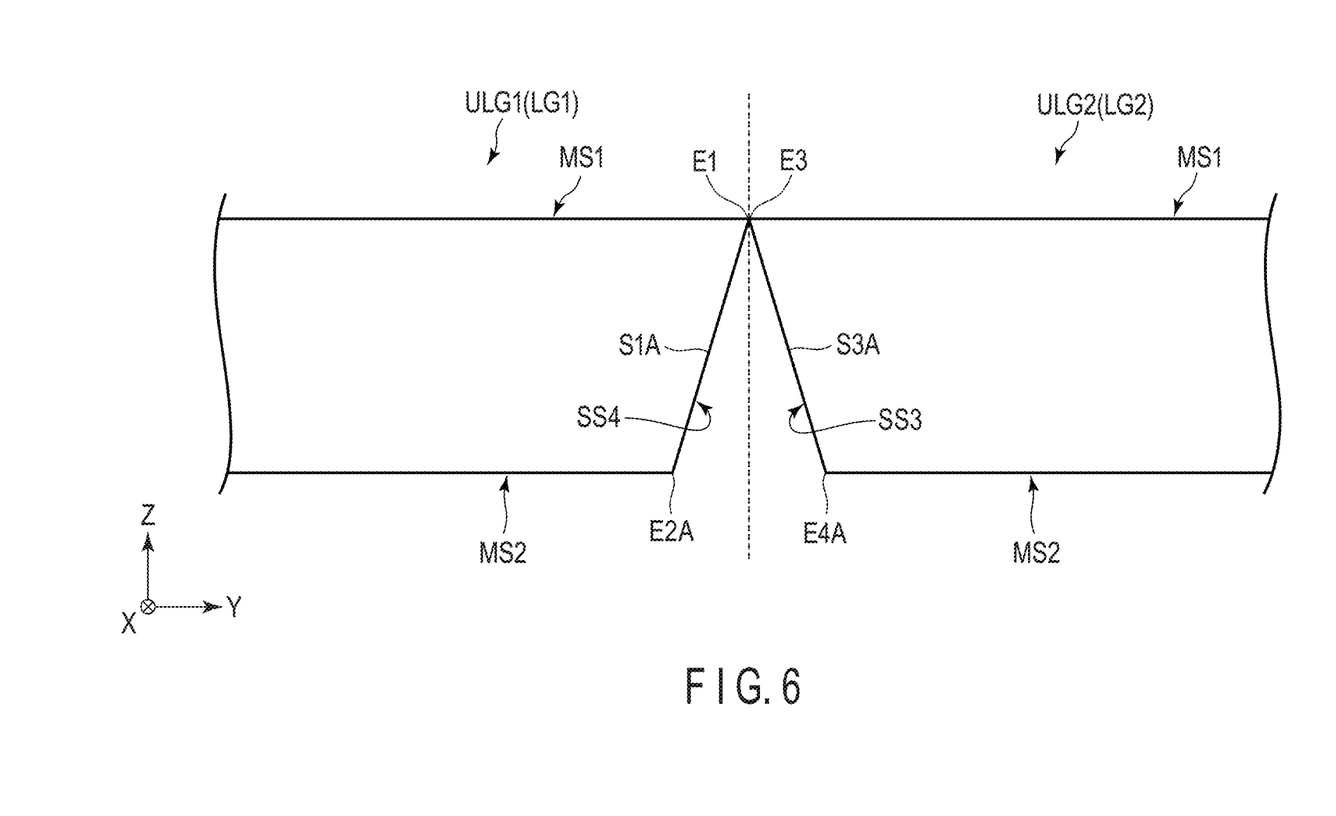
FIG. 6 is a cross-sectional view for explaining the shape of a connection portion in an illumination device according to a comparative example.

FIG. 6 is a diagram showing a connection portion of a light guide provided in an illumination device according to a comparative example. As shown in FIG. 6, the configuration of the comparative example is different from that of the present embodiment in respect that the fourth side surface SS4 of the upper light guide ULG1 of the first light guide LG1 does not include the second connection surface comprising the side S2 described above, and further, the third side surface SS3 of the upper light guide ULG2 of the second light guide LG2 does not include the fourth connection surface comprising the side S4 described above. In other words, in the configuration of the comparative example, the fourth side surface SS4 of the upper light guide ULG1 of the first light guide LG1 merely includes a connection surface comprising an oblique side S1A which extends from the end portion E1 of the first main surface MS1 to the end portion E2A of the second main surface MS2. The third side surface SS3 of the upper light guide ULG2 of the second light guide LG2 merely includes a connection surface comprising an oblique side S3A which extends from the end portion E3 of the first main surface MS1 to the end portion E4A of the second main surface MS2. It should be noted that the first angle D1A between the oblique side S1A of the upper light guide ULG1 and direction Z and the second angle D2A between the oblique side S3A of the upper light guide ULG2 and direction Z may be referred to as taper angles.

Figure 7:
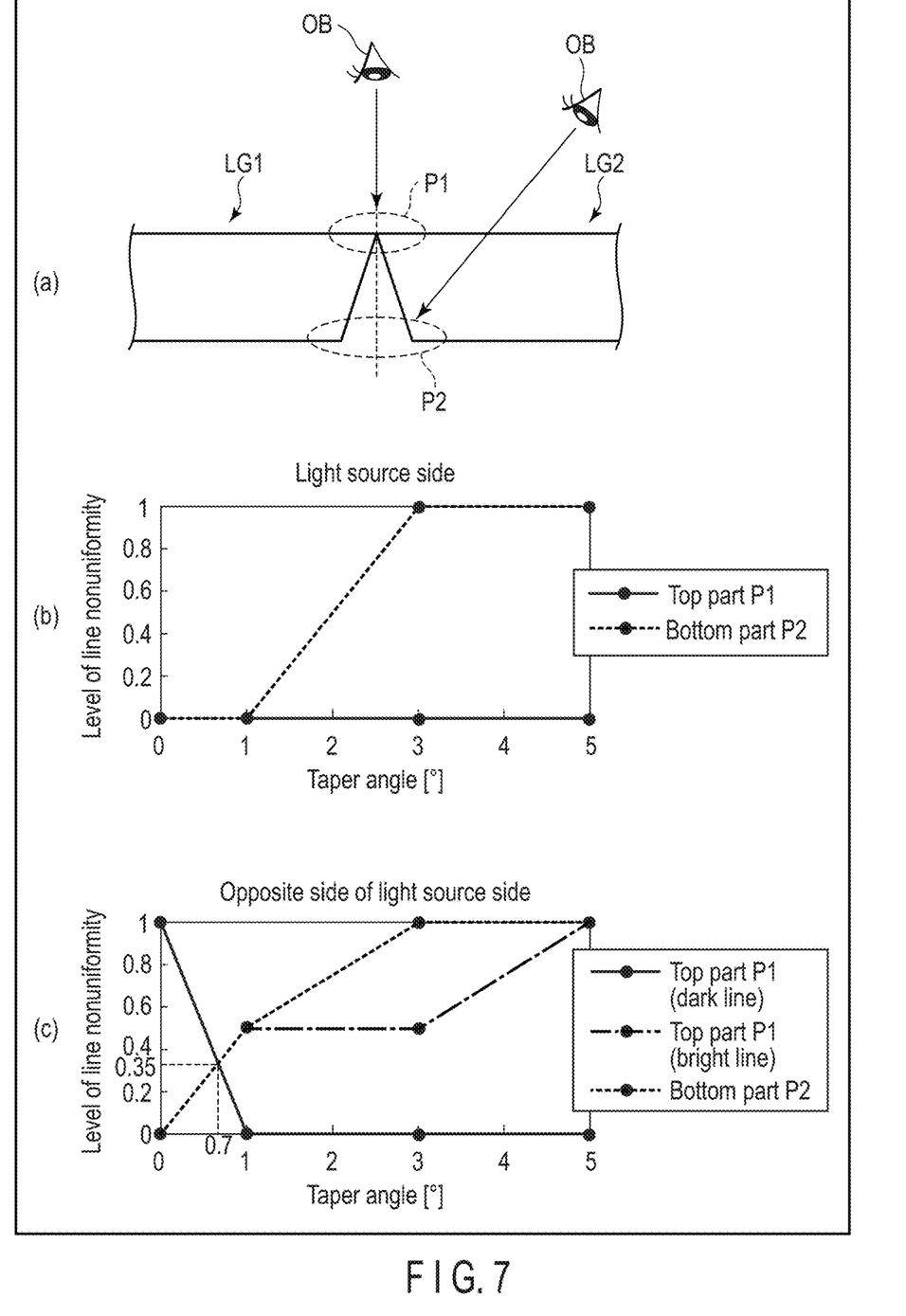
FIG. 7 is a diagram for explaining the line nonuniformity caused by the connection portion in the illumination device according to the comparative example.

FIG. 7 is a diagram for explaining the line nonuniformity of the connection portion when the display device comprising the illumination device of the comparative example is observed. FIG. 7(a) is a diagram for explaining which part of the connection portion is viewed when the display device comprising the illumination device of the comparative example is observed in the front direction, and which part of the connection portion is viewed when the display device is observed in an oblique direction. FIG. 7(b) is a diagram for explaining the line nonuniformity of the connection portion on the light source side when the display device comprising the illumination device of the comparative example is observed. FIG. 7(c) is a diagram for explaining the line nonuniformity of the connection portion on the opposite side of the light source side when the display device of the illumination device of the comparative example is observed. In FIG. 7(b) and FIG. 7(c), the vertical axis of each graph shows the level of line nonuniformity, and the horizontal axis shows the taper angle described above (in other words, the values of the first angle D1A and the second angle D2A). The level of line nonuniformity indicates that line nonuniformity is more easily viewed as the value is increased. In terms of the display quality, the level of line nonuniformity should be preferably low.

As shown in FIG. 7(a), when an observer OB observes the display device in the front direction, the top part P1 of the connection portion is viewed by the observer OB. Thus, there is a possibility that the top part P1 of the connection portion is recognized as line nonuniformity by the observer OB. When the observer OB observes the display device in an oblique direction, the bottom part P2 of the connection portion is viewed by the observer OB. Thus, there is a possibility that the bottom part P2 of the connection portion is recognized as line nonuniformity by the observer OB.

In the configuration of the comparative example, the first light guide LG1 is in line-contact with the second light guide LG2 in the top part P1 of the connection portion excluding the case where the taper angle is 0°. Further, in the configuration of the comparative example, the first light guide LG1 is not in contact with the second light guide LG2 in the bottom part P2 of the connection portion. In other words, a gap is defined between the first light guide LG1 and the second light guide LG2. The size of this gap is increased as the taper angle is increased.

As shown by the solid line of FIG. 7(b), the level of the line nonuniformity of the top part P1 of the connection portion on the light source side is substantially naught regardless of the value of the taper angle. On the light source side, the top part P1 of the connection portion is not recognized as line nonuniformity by the observer OB. To the contrary, as shown by the broken line of FIG. 7(b), the level of the line nonuniformity of the bottom part P2 of the connection portion on the light source side tends to increase as the taper angle increases. In other words, as the size of the gap between the first light guide LG1 and the second light guide LG2 is increased, the gap is more easily recognized as line nonuniformity by the observer OB.

On the opposite side of the light source side, there is a possibility that the top part P1 of the connection portion is recognized as a dark line or a bright line. As shown by the solid line of FIG. 7(c), a dark line is easily recognized when the first light guide LG1 is in face-contact with the second light guide LG2 (in other words, when the taper angle is 0°). As the taper angle is increased, such a dark line becomes more difficult to recognize. As shown by the dashed line of FIG. 7(c), a bright line is easily recognized when the first light guide LG1 is in line-contact with the second light guide LG2. The level of the nonuniformity of a bright line tends to increase as the taper angle increases. As shown by the broken line of FIG. 7(c), the level of the line nonuniformity of the bottom part P2 of the connection portion on the opposite side of the light source side tends to increase as the taper angle increases in a manner similar to that of the light source side.

As described above, in the configuration of the comparative example, to minimize the various types of levels of line nonuniformity on the light source side and the various types of levels of line nonuniformity on the opposite side, the taper angle needs to be set so as to be approximately 0.7°. By this method, the levels of the line nonuniformity of the top part P1 of the connection portion and the bottom part P2 of the connection portion on the light source side can be substantially naught, and the levels of the line nonuniformity of the top part P1 of the connection portion and the bottom part P2 of the connection portion on the opposite side can be approximately 0.35.

Figure 8:
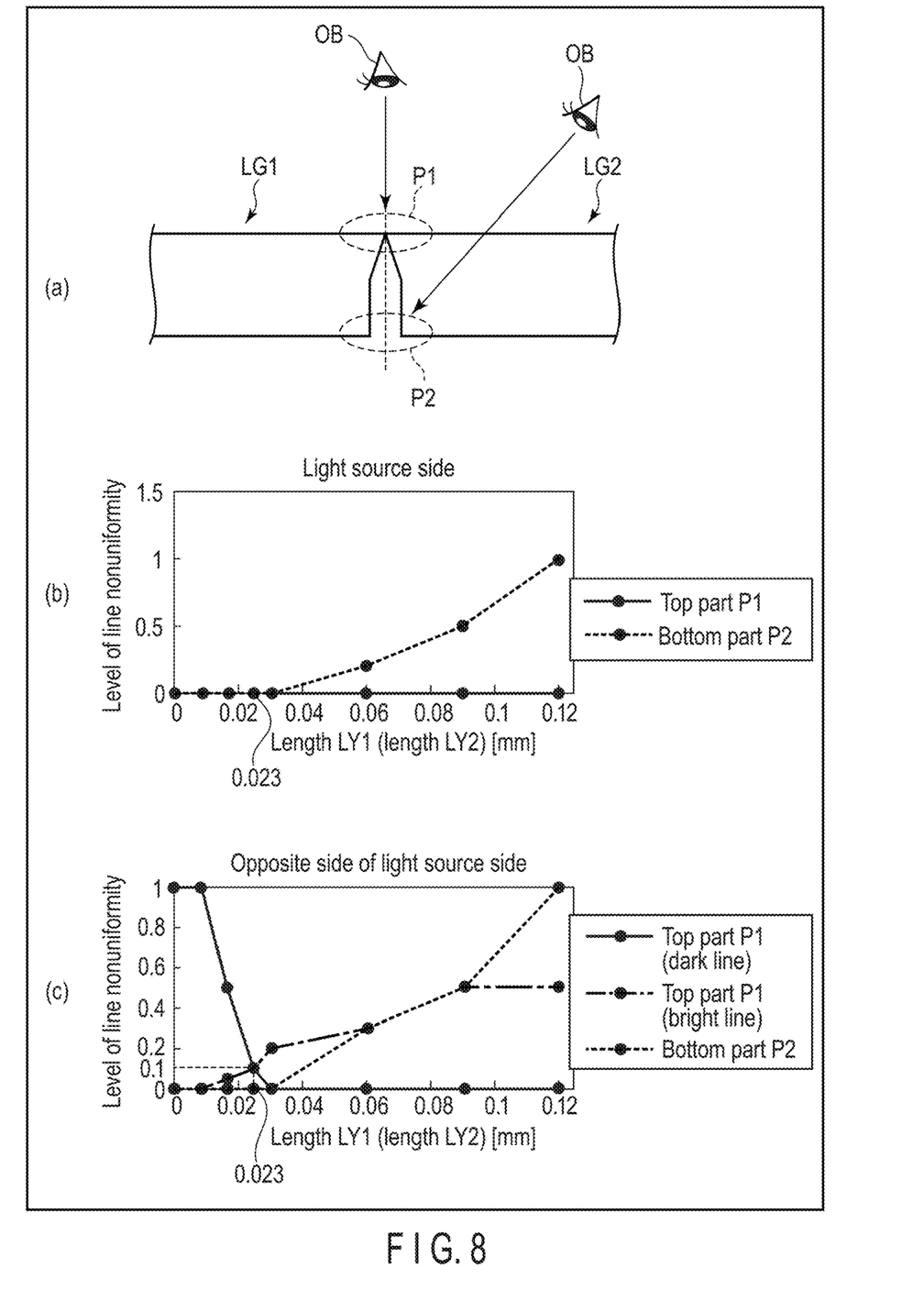
FIG. 8 is a diagram for explaining the line nonuniformity caused by the connection portion in the illumination device according to the embodiment.

In the configuration of the present embodiment, the levels of the line nonuniformity of the top part P1 of the connection portion and the bottom part P2 of the connection portion on the light source side and the levels of the line nonuniformity of the top part P1 of the connection portion and the bottom part P2 of the connection portion on the opposite side of the light source side can be further decreased. In the following description, this specification explains the line nonuniformity of the connection portion when the display device DSP comprising the illumination device IL of the present embodiment is observed with reference to FIG. 8.

FIG. 8(a) is a diagram for explaining which part of the connection portion is viewed when the display device DSP comprising the illumination device IL of the present embodiment is observed in the front direction, and which part of the connection portion is viewed when the display device DSP is observed in an oblique direction. FIG. 8(b) is a diagram for explaining the line nonuniformity of the connection portion on the light source side when the display device DSP comprising the illumination device IL of the present embodiment is observed. FIG. 8(c) is a diagram for explaining the line nonuniformity of the connection portion on the opposite side of the light source side when the display device DSP comprising the illumination device IL of the present embodiment is observed.

As shown in FIG. 8(a), when the observer OB observes the display device DSP in the front direction, the top part P1 of the connection portion is viewed by the observer OB. Thus, there is a possibility that the top part P1 of the connection portion is recognized as line nonuniformity by the observer OB. When the observer OB observes the display device in an oblique direction, the bottom part P2 of the connection portion is viewed by the observer OB. Thus, there is a possibility that the bottom part P2 of the connection portion is recognized as line nonuniformity by the observer OB.

In the configuration of the present embodiment, in a manner different from that of the configuration of the comparative example, the gap in the bottom part P2 of the connection portion is not determined by the taper angle, and instead, is determined by length LY1 and length LY2 shown in FIG. 5. For this reason, in the graphs shown in FIG. 8(b) and FIG. 8(c), in a manner different from that of the graphs shown in FIG. 7, the horizontal axis indicates length LY1 (length LY2). FIG. 8(b) and FIG. 8(c) show the levels of line uniformity when both of the taper angles (in other words, the values of the first angle D1 and the second angle D2) are 3°, and further, both of the plate thicknesses of the light guides (in other words, plate thicknesses T of the upper light guide ULG and the lower light guide LLG) are 2.2 mm.

As shown by the solid line of FIG. 8(b), the level of the line nonuniformity of the top part P1 of the connection portion on the light source side is substantially naught regardless of the value of length LY1. On the light source side, the top part P1 of the connection portion is not recognized as line nonuniformity by the observer OB. To the contrary, as shown by the broken line of FIG. 8(b), the level of the line nonuniformity of the bottom part P2 on the light source side tends to increase as length LY1 increases. In other words, as the size of the gap between the first light guide LG1 and the second light guide LG2 is increased, the gap is more easily recognized as line nonuniformity by the observer OB.

On the opposite side of the light source side, as shown by the solid line of FIG. 8(c), a dark line is more easily recognized by the observer OB as length LY1 is decreased. Such a dark line becomes more difficult to recognize as length LY1 is increased. To the contrary, as shown by the dashed line of FIG. 8(c), a bright line is more easily recognized by the observer OB as length LY1 is increased. Such a bright line becomes more difficult to recognize as length LY1 is decreased. As shown by the broken line of FIG. 8(c), the level of the line nonuniformity of the bottom part P2 of the connection portion on the opposite side of the light source side tends to increase as length LY1 increases in a manner similar to that of the light source side.

As described above, in the configuration of the present embodiment, to minimize the various types of levels of line nonuniformity on the light source side and the various types of levels of line nonuniformity on the opposite side, length LY1 needs to be set so as to be 0.023 mm. By this method, the levels of the line nonuniformity of the top part P1 of the connection portion and the bottom part P2 of the connection portion on the light source side can be substantially naught, and the levels of the line nonuniformity of the top part P1 of the connection portion and the bottom part P2 of the connection portion on the opposite side can be approximately 0.1. In other words, compared to the configuration of the comparative example shown in FIG. 6 and FIG. 7, the levels of the line nonuniformity of the top part P1 of the connection portion and the bottom part P2 of the connection portion on the opposite side of the light source side can be further decreased. In other words, the connection portion can be made inconspicuous compared to the configuration of the comparative example.

In the present embodiment, this specification explains a case where each of the connection portion of the upper light guide ULG and the connection portion of the lower light guide LLG has the shape shown in FIG. 5. However, the shapes are not limited to this example. For example, the connection portion of the upper light guide ULG and the connection portion of the lower light guide LLG may integrally have the shape shown in FIG. 5. In this case, similarly, the connection portion can be made inconspicuous compared to the configuration of the comparative example.

The embodiments explained above can provide the illumination device IL which can prevent line nonuniformity in the connection portions of the light guides LG1 to LG3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
a first light guide;
a second light guide which is adjacent to and connected to the first light guide in a first direction; and
a plurality of light sources which emit light to the first light guide and the second light guide, wherein
the first light guide comprises a first main surface, a second main surface facing the first main surface, and a first side surface connected to the second light guide,
the second light guide comprises a third main surface, a fourth main surface facing the third main surface, and a second side surface connected to the first light guide,
the first side surface further includes a first connection surface and a second connection surface, the first connection surface extending from an end portion of the first main surface to the second main surface and obliquely extending so as to move away from the second side surface, the second connection surface perpendicularly extending from an end portion of the first connection surface to an end portion of the second main surface,
the second side surface further includes a third connection surface and a fourth connection surface, the third connection surface extending from an end portion of the third main surface to the fourth main surface and obliquely extending so as to move away from the first side surface, the fourth connection surface perpendicularly extending from an end portion of the third connection surface to an end portion of the fourth main surface;
wherein the first light guide comprises a first upper light guide, and a first lower light guide provided under the first upper light guide,
the second light guide comprises a second upper light guide, and a second lower light guide provided under the second upper light guide, and
each of the first upper light guide and the first lower light guide comprises the first main surface, the second main surface and the first side surface, and each of the second upper light guide and the second lower light guide comprises the third main surface, the fourth main surface and the second side surface.

2. The illumination device of claim 1, wherein
the end portion of the first main surface is in contact with the end portion of the third main surface, and
the end portion of the second main surface is not in contact with the end portion of the fourth main surface.

3. The illumination device of claim 1, wherein
the end portion of the first main surface does not overlap the end portion of the second main surface in plan view, and
the end portion of the third main surface does not overlap the end portion of the fourth main surface in plan view.

4. The illumination device of claim 1, wherein
a first angle between the first connection surface and a thickness direction of the first light guide and the second light guide is set so as to be a value from 1° to 5°, and a second angle between the third connection surface and the thickness direction is set so as to be a value from 1° to 5°.

5. The illumination device of claim 4, wherein
the first angle and the second angle are set so as to be a same value.

6. The illumination device of claim 4, wherein when each of the first upper light guide, the first lower light guide, the second upper light guide and the second lower light guide has a length of 2.2 mm in the thickness direction, and further, both the first angle and the second angle are set so as to be 3°, both a length from the end portion of the second main surface to the end portion of the first main surface in the first direction and a length from the end portion of the fourth main surface to the end portion of the third main surface in the first direction are set so as to be 0.023 mm.

7. The illumination device of claim 4, wherein the light sources include a first light source which emits light to the first upper light guide and the second upper light guide, and a second light source which emits light to the first lower light guide and the second lower light guide, the first light source emits light to a third side surface of the first upper light guide and a fourth side surface of the second upper light guide, and the second light source emits light to a fifth side surface which is a side surface of the first lower light guide and is located on an opposite side of the third side surface, and a sixth side surface which is a side surface of the second lower light guide and is located on an opposite side of the fourth side surface.

8. The illumination device of claim 7, wherein
the third side surface is adjacent to the fourth side surface in the first direction, and
the fifth side surface is adjacent to the sixth side surface in the first direction.

9. The illumination device of claim 1, wherein
mirror finishing is applied to each of the first connection surface, the second connection surface, the third connection surface and the fourth connection surface.

* * * * *